(12) United States Patent
Wawrzynowski

(10) Patent No.: US 7,004,316 B2
(45) Date of Patent: Feb. 28, 2006

(54) APPARATUS FOR HOLDING A MEDIA STORAGE DISK

(75) Inventor: Michael Wawrzynowski, Torrance, CA (US)

(73) Assignee: Infiniti Media, Inc., Torrance, CA (US)

( * ) Notice: Subject to any disclaimer, the term of this patent is extended or adjusted under 35 U.S.C. 154(b) by 0 days.

(21) Appl. No.: 10/726,898

(22) Filed: Dec. 2, 2003

(65) Prior Publication Data

US 2005/0115847 A1    Jun. 2, 2005

(51) Int. Cl.
*B65D 85/57*    (2006.01)

(52) U.S. Cl. .................. 206/308.1; 206/309

(58) Field of Classification Search ............ 206/308.1, 206/309–313, 493

See application file for complete search history.

(56) References Cited

U.S. PATENT DOCUMENTS

| | | | |
|---|---|---|---|
| 6,412,631 B1 * | 7/2002 | Belden, Jr. ............... | 206/308.1 |
| 6,419,084 B1 * | 7/2002 | Sandor .................... | 206/308.1 |
| 6,425,481 B1 * | 7/2002 | Choi ........................ | 206/308.1 |
| 6,547,068 B1 * | 4/2003 | Chu ......................... | 206/310 |
| 6,683,847 B1 * | 1/2004 | Kutaragi et al. ........... | 720/703 |
| 6,779,659 B1 * | 8/2004 | Marsilio et al. ......... | 206/308.1 |
| 6,789,667 B1 * | 9/2004 | Belden et al. ............. | 206/310 |

\* cited by examiner

*Primary Examiner*—Shian T. Luong
(74) *Attorney, Agent, or Firm*—Charles C.H. Wu; Wu & Cheung, LLP

(57) ABSTRACT

An apparatus is provided for holding a compact disk having a central hole. The apparatus includes a body portion and at least three arms. Each arm extends radially inward from a distal end connected to the body portion to an engageable end receivable within the central hole. Each engageable end has at least one extension member connected to the body portion. Each of the arms has a first pivot axis positioned substantially at the distal end, a second pivot axis positioned substantially at the extension member, and a third pivot axis positioned in between the first and second pivot axes.

9 Claims, 5 Drawing Sheets

APPARATUS FOR HOLDING A MEDIA STORAGE DISK

BACKGROUND OF THE INVENTION

1. Field of the Invention

The invention relates in general to an apparatus for holding a media storage disk, more particularly an apparatus having an improved central retaining area for the retention of the media storage disk.

2. Description of the Related Art

Media storage disks have gained popularity with consumers. Examples of media storage disks include, but are not limited to, the compact disk (CD), the digital video disk (DVD) and the video compact disk (VCD).

Numerous storage cases have been developed for media storage disks. It is appreciated by designers of storage cases that it is undesirable for any portion of the case to be in contact with the information-carrying portions of the disk. Thus, developments in storage case design have involved means that limit the contact of the case with the disk to the central hole of the disk.

In addition to addressing the retention of media storage disks, case designs have also provided for the convenient ejection of the disk. Because DVDs consist of two laminated layers of polycarbonate, the bending of the DVDs for engagement and removal can cause disk and hence data damage. To avoid this damage, it is desirable for a case to provide convenient insertion and removal of the disk.

A common problem associated with most storage case designs is disk loosening and removal from a prepackaged case. A prepackaged case typically has an embedded alarm sensor. The actual disk, however, has no alarm-sensing device. By pressing the center of the storage case wall against the disk, it is possible to loosen and disengage a disk from the central retaining area.

This design flaw facilitates the theft of disks from their prepackaged cases. In addition, it greatly increases the susceptibility of disk damage during normal handling, transport and storage procedures.

Thus, the need arises for a media storage case that limits the contact of the case with information-carrying portions of the disk, allows for easy disk insertion and removal, and is not susceptible to disk loosening and removal from the central retaining portion.

In U.S. Pat. No. 6,227,362, Cheung discloses an apparatus for holding a media storage disk with a central hole. Although Cheung lessens the susceptibility to disk loosening when pressure is applied to the center of the storage case, it does not provide for convenient insertion of the disk. Before inserting the disk, the central retaining area must be positioned into a disk-releasing position by applying pressure to an articulation axis. This leads to an additional step in the disk packaging process, which is undesirable.

Unlike Cheung, the present invention uses pivot axes on each of the extending arms. The configuration of the present invention eliminates the need for applying pressure to an articulation axis, thus facilitating the disk packaging process. Disks can simply be pressed onto the central retaining area when packaging.

SUMMARY OF THE INVENTION

Accordingly, one object of the present invention is to provide a disk storage apparatus having an improved central retaining area for the retention of a media storage disk.

A second object of the invention is to provide a disk storage apparatus that limits contact with information-carrying portions of the disk.

A third object of the invention is to provide a disk storage apparatus that allows for easy insertion and removal of the disk.

A fourth object of the invention is to provide a disk storage apparatus that is not susceptible to disk loosening and removal when pressure is applied to the center of the storage case.

A fifth object of the invention is to provide a disk storage apparatus that facilitates the disk packaging process by eliminating the need for performing additional steps when transitioning between a disk-releasing position and a disk-securing position.

To achieve these and other advantages and in accordance with the purpose of the invention, as embodied and broadly described herein, the invention provides an apparatus for holding a compact disk having a central hole. The apparatus includes a body portion and at least three arms. Each arm extends radially inward from a distal end connected to the body portion to an engageable end receivable within the central hole. Each engageable end has at least one extension member connected to the body portion. Each of the arms has a first pivot axis positioned substantially at the distal end, a second pivot axis positioned substantially at the extension member, and a third pivot axis positioned in between the first and second pivot axes.

DESCRIPTION OF THE PREFERRED EMBODIMENTS

Figure 1:
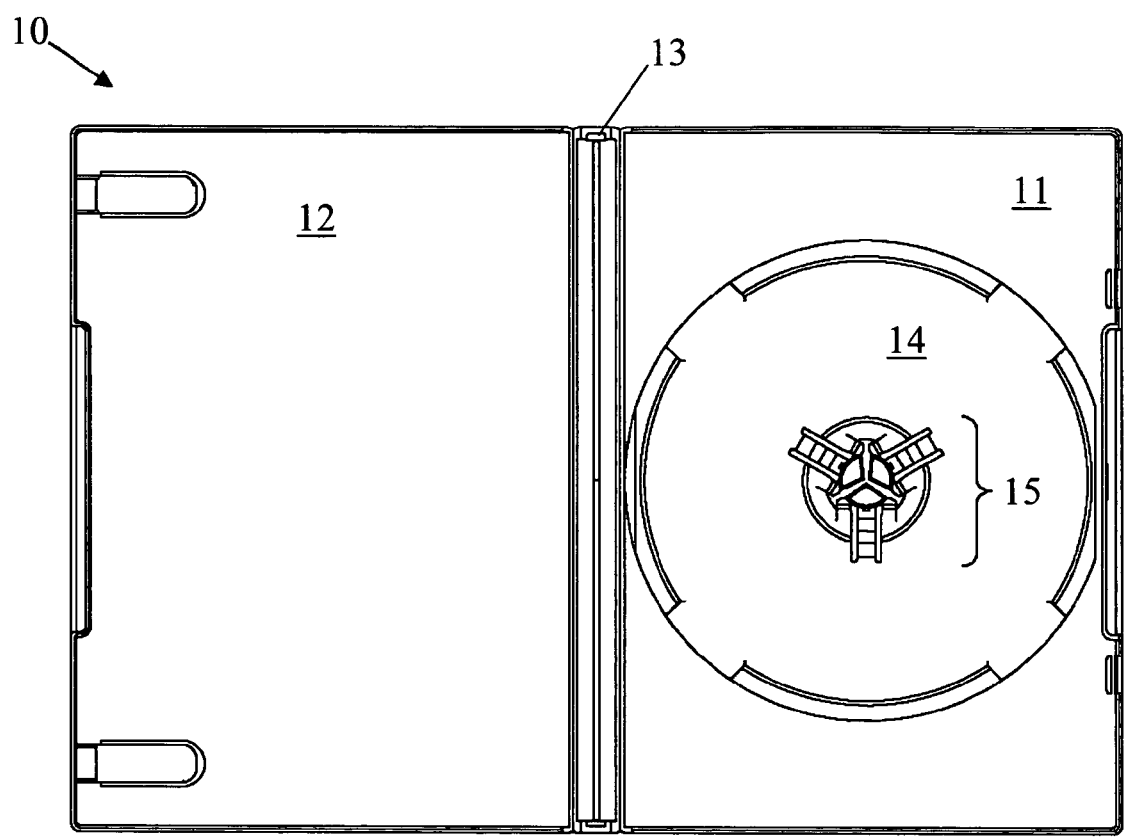
FIG. 1 is a perspective view of a case that incorporates the apparatus for holding a media storage disk in accordance with the present invention, the case being in a fully open position with the interior portion visible.
Figure 2:
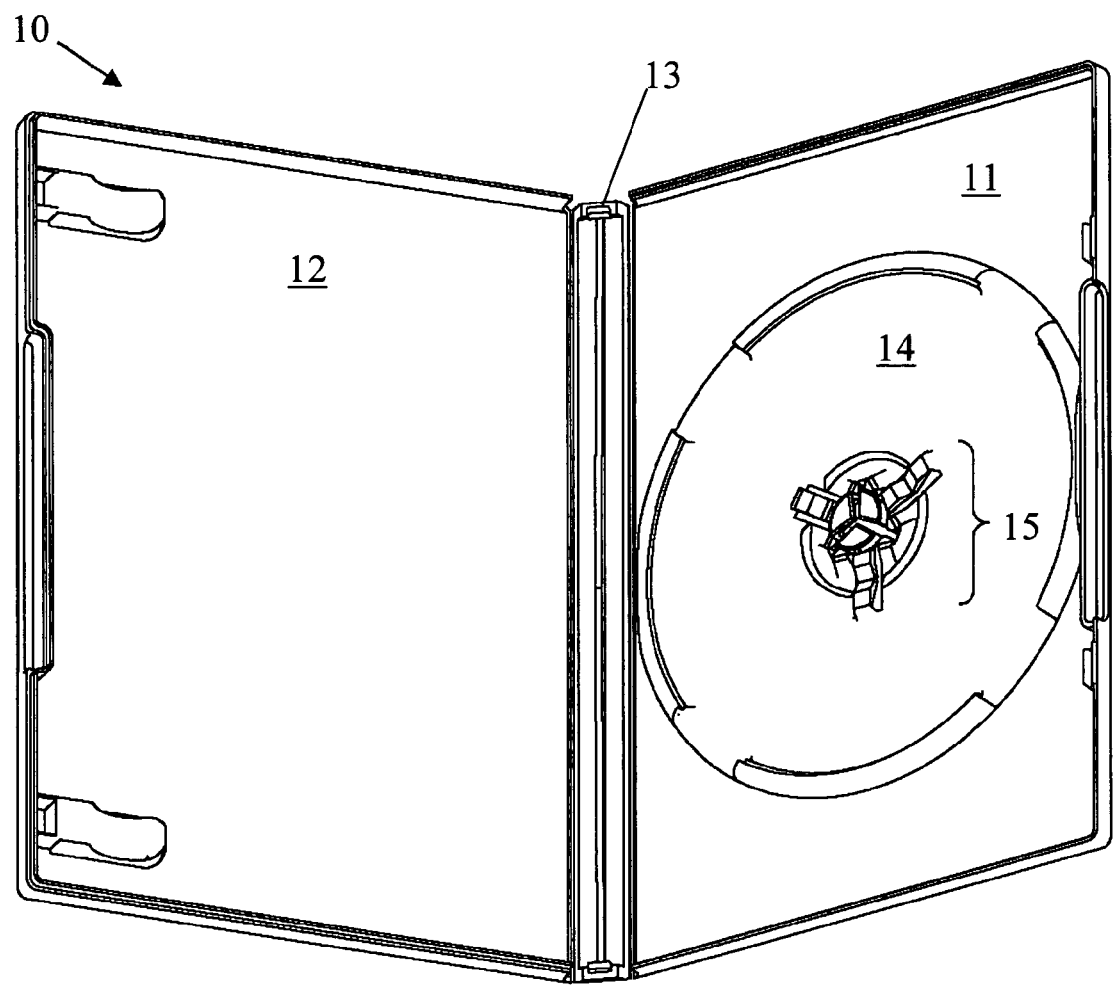
FIG. 2 is a perspective view of the case as shown in FIG. 1, the case being in a partially open position with the interior portion visible.

Referring now to FIGS. 1 and 2, perspective views of a case that incorporates the apparatus for holding a media storage disk in accordance with the present invention are shown. FIG. 1 illustrates case 10 in a fully open position with the interior portion visible. FIG. 2 shows case 10 in a partially open position.

Case 10 can provide enclosure to hold a media storage disk such as, but not limited to, a CD, DVD, or VCD. Case 10 preferably includes a disk-receiving portion 11 and a cover portion 12. Disk-receiving portion 11 can move relative to cover portion 12 via a hinged region 13, so that when case 10 is in a closed position, disk-receiving portion 11 and cover portion 12 form an enclosure around the disk.

Still referring to FIGS. 1 and 2, disk-receiving portion 11 contains a body portion 14 including a central retaining area 15. Body portion 14 may provide for the entire or a substantial part of disk-receiving portion 11, or may be a separate or stepped molding. Body portion 14 may also be an insert receivable within case 10. Central retaining area 15 provides for securing the media storage disk within case 10 and is now described in further detail.

Figure 3:
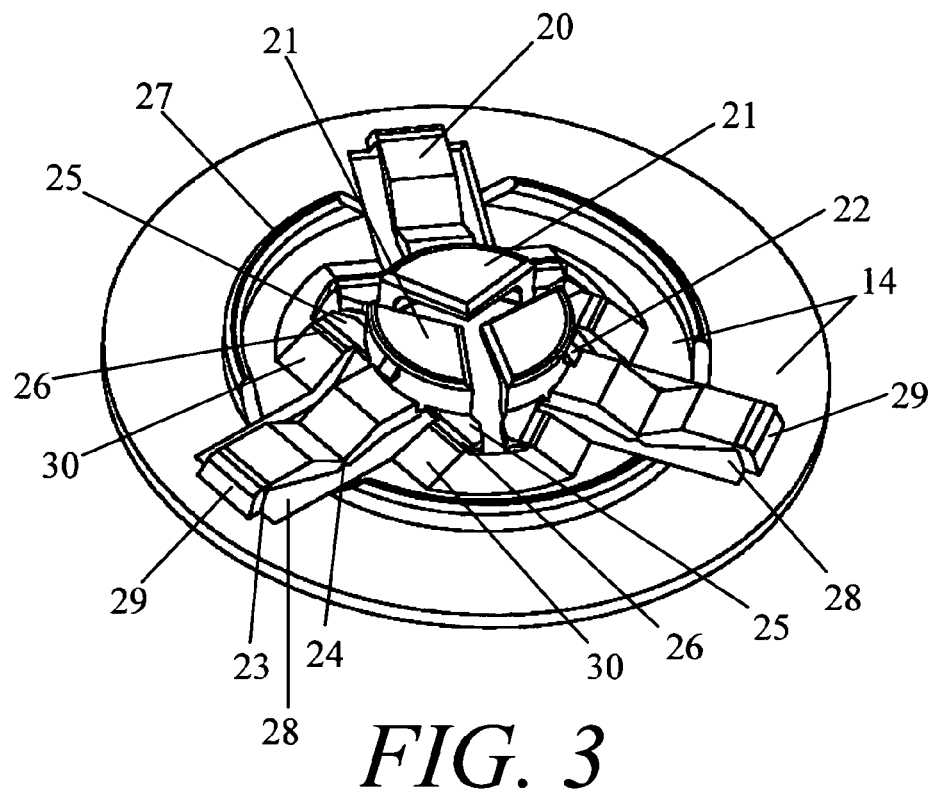
FIG. 3 is a perspective view of a preferred embodiment of the present invention in the disk-locking position for securing the disk.

With reference to FIG. 3, a perspective view of a preferred embodiment of the present invention in the disk-locking position for securing the disk is shown. Central retaining area 15 includes at least three radially centralized ejecting arms 20. Each arm 20 extends toward the center with an engageable end 21. Engageable ends 21 meet at a center hole axis to form a pie-shaped engageable region. The outside edge of each engageable end 21 includes one or more retention lips 22. Retention lips 22 secure the top surface of the disk when in a disk-locking position.

Still referring to FIG. 3, ridges 27 are elevated from body portion 14 to support the bottom surface of the disk. Ridges 27 are positioned so as not to contact an information-carrying portion of the disk. Although this embodiment contains three ridges 27, three or more ridges may be employed for the present invention.

Figure 4:
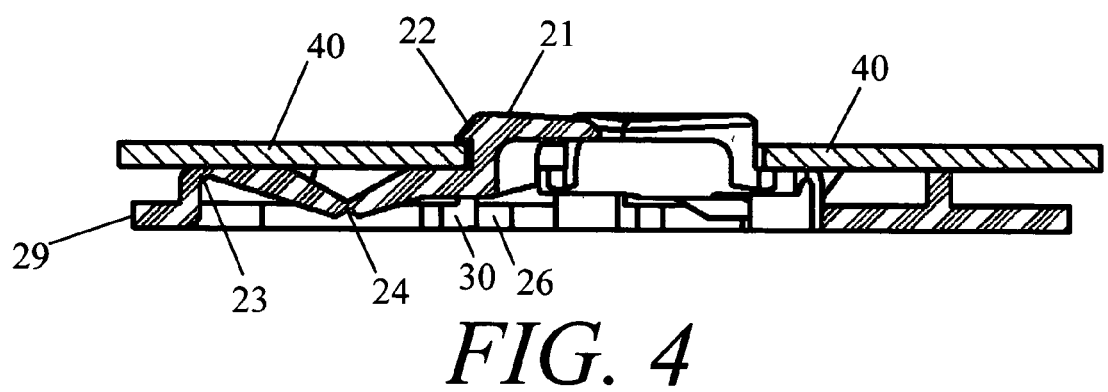
FIG. 4 is a cross-sectional view taken along the line B—B of FIG. 8, when the apparatus is in the disk-locking position.
Figure 8:
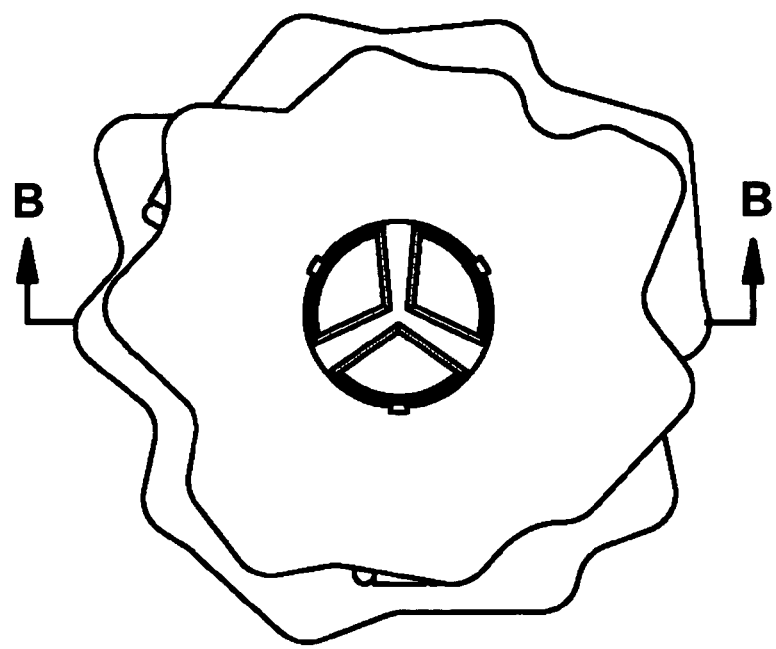
FIG. 8 is a plan view of the apparatus of the present invention in the disk-locking position.

Referring now to FIG. 4, a cross-sectional view taken along the line B—B of FIG. 8, when the apparatus is in the disk-locking position is shown. The pie-shaped region formed by engageable ends 21 is received within the central hole of disk 40. Retention lips 22 secure the upper surface of disk 40 while ridges 27 provide support on the bottom surface of disk 40. Arms 20 may provide additional support on the bottom surface of disk 40, preferably without contacting an information-carrying portion.

Each arm 20 contains a first pivot axis 23, a second pivot axis 26 and a third pivot axes 24. Pivot axes 23, 24 and 26 are preferably in triangle type closed loop combination. Each arm 20 connects to body portion 14 at distal end 29. First pivot axis 23 is positioned furthest from engageable end 21, being near or at distal end 29.

Second pivot axis 26 is positioned near or at engageable end 21. The lower area of each engageable end 21 includes at least one extension member 25 attached to body portion 14 at connecting members 30, where connecting members 30 are preferably elevated from body portion 14. Extension members 25 and connecting members 30 are pivotally attached at second pivot axis 26.

Third pivot axis 26 is positioned on arm 20 in between first pivot axis 23 and second pivot axis 26. Gap 28, as seen in FIG. 3, allows first pivot axis 23, second pivot axis 26, and third pivot axes 24 to pivot in upward and downward directions without obstructing the movement of arm 20. This allows for the tilting of engageable ends 21 when transitioning between the disk-locking position for securing the disk and the disk-releasing position for removing the disk.

Figure 5:
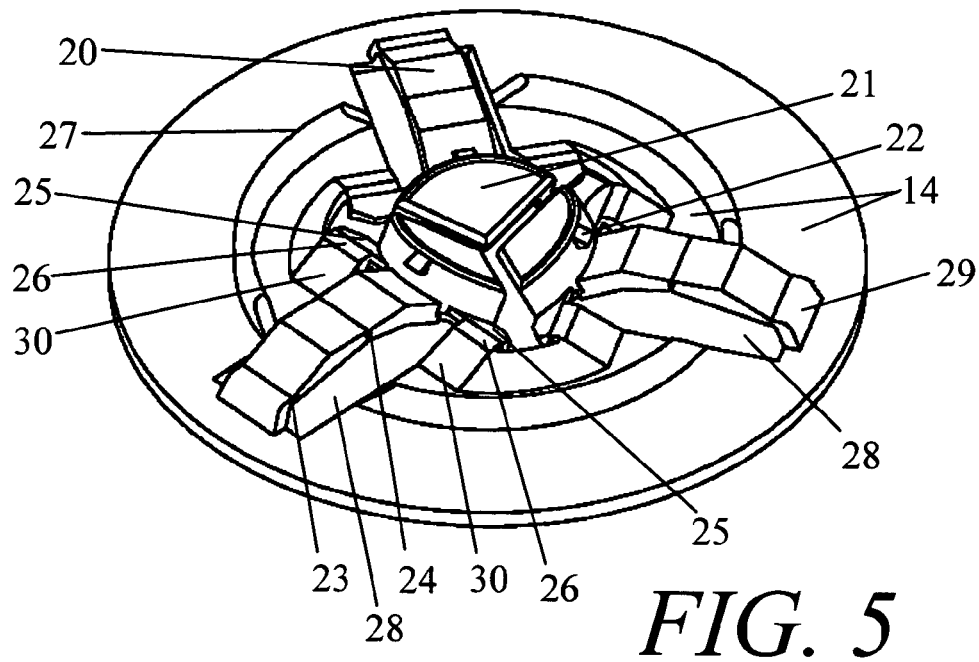
FIG. 5 is a perspective view of a preferred embodiment of the present invention in the disk-releasing position for removing the disk.

With reference to FIG. 5, a perspective view of a preferred embodiment of the present invention in the disk-releasing position for removing the disk is shown. In the disk-releasing position, engageable ends 21 are tilted towards the center, thus decreasing the bounded region of retention lips 22.

To transition from the disk-locking to the disk-releasing position, pressure from a finger or an alternative source must be applied to the center of the pie-shaped engageable region. This causes retention lips 22 to elevate and decreases their bounded region.

Figure 6:
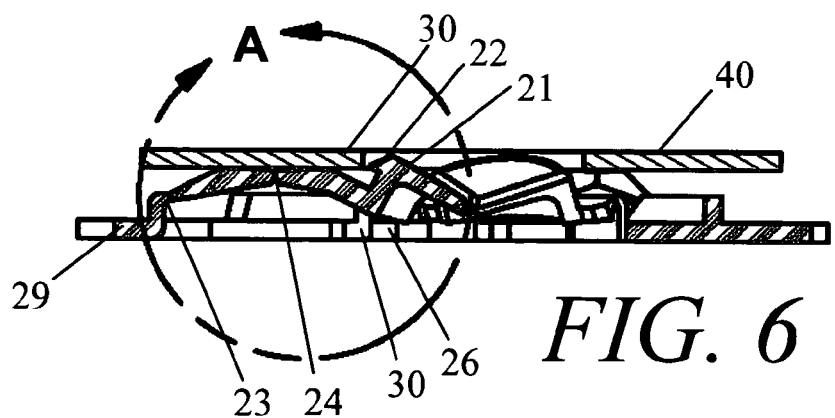
FIG. 6 is a cross-sectional view taken along the line C—C of FIG. 9, when the apparatus is in the disk-releasing position.
Figure 9:
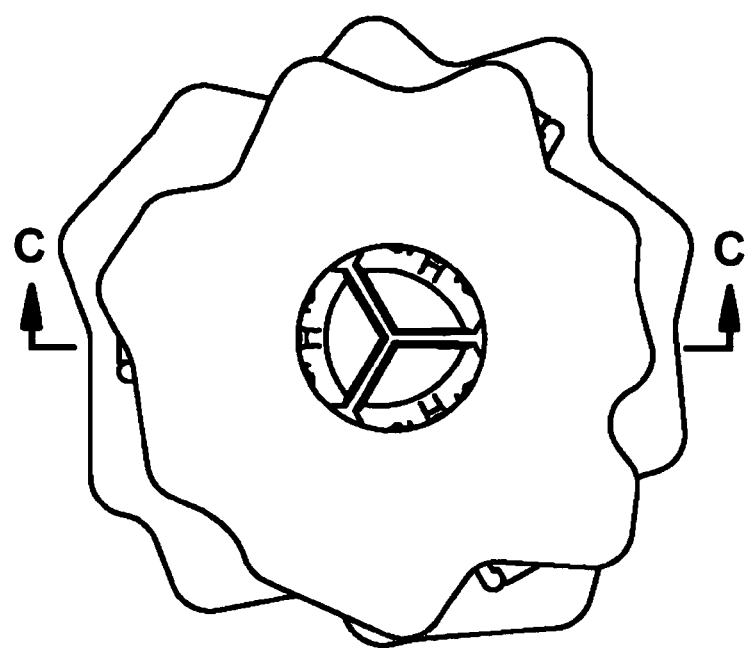
FIG. 9 is a plan view of the apparatus of the present invention in the disk-releasing position.

Referring now to FIG. 6, a cross-sectional view taken along the line C—C of FIG. 9, when the apparatus is in the disk-releasing position is shown. As pressure is applied to the center, the bounded region of retention lips 22 decreases to a size less than the circumference of the central hole of disk 40. At this point, retention lips 22 no longer secure the upper surface of disk 40, and disk 40 becomes loosened for removal. Thus, it can be seen that disk loosening is simplified by only requiring the application of pressure to the center of the pie-shaped engageable region.

In the disk-releasing position as shown in FIG. 6, arms 20 are arched along first pivot axes 23, second pivot axes 24, and third pivot axes 26 to support and/or elevate disk 40 for easier removal. Arms 20 preferably do not contact an information-carrying portion of disk 40. The apparatus remains substantially in the disk-releasing position after disk 40 is removed.

Disk 40 is not susceptible to loosening when case 10 is closed. In the disk-locking position, engageable regions 21 are substantially flat. The vertical plane of pivot axes 23, 24 and 26 is positioned towards the center, away from the vertical plane created by the contact points of the pressed storage case wall against the top of central retaining area 15. By pressing on the center of storage case wall 12, pressure is not directed to the center of the pie-shaped engageable region. Therefore, engageable regions 22 cannot do not tilt so as to loosen disk 40.

Figure 7:
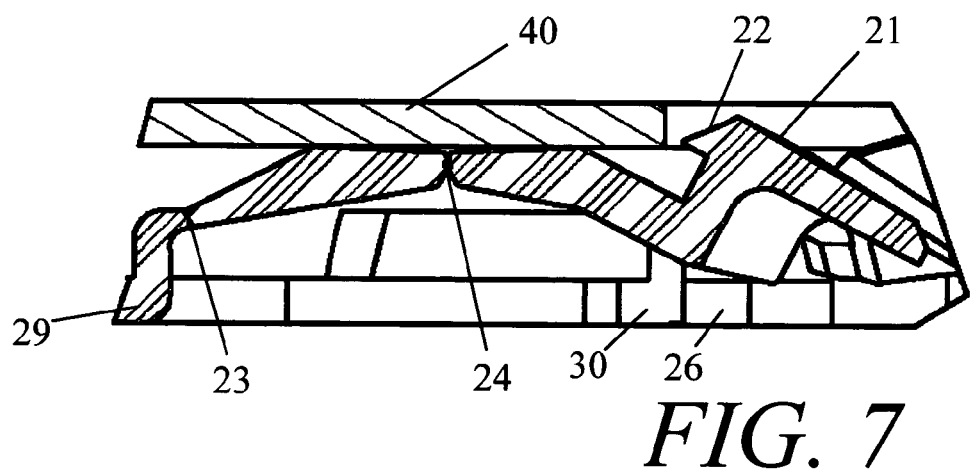
FIG. 7 is an enlarged cross-sectional view of region A in FIG. 6.

With reference to FIG. 7, an enlarged cross-sectional view of region A in FIG. 6 is shown. Disk 40 can be inserted into case 10 by positioning the central hole of disk 40 around the pie-shaped engageable region and applying pressure to disk 40. The pressure applied to disk 40 transfers to arched arms 20. This transferred pressure flattens out engageable ends 21 and increases the bounded region of retention lips 22, allowing retention lips 22 to support the upper surface of disk 40. Thus, disk insertion and packaging is simplified by only requiring the centering of disk 40 on opened storage case 10 and the application of pressure on disk 40.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An apparatus for holding a compact disk having a central hole comprising:
   a body portion;
   at least three arms each extending radially inward from a distal end connected to the body portion to an engageable end receivable within the central hole, the engageable end having at least one extension member connected to the body portion; and
   wherein each of the arms has a first pivot axis positioned substantially at the distal end, a second pivot axis positioned substantially at the extension member, and a third pivot axis positioned in between the first and second pivot axes;
   wherein each engageable end further comprises at least one lip for securing a top surface of the disk when in a disk-locking position;

wherein the engageable ends form a pie-shaped engageable region receivable within the central hole of the disk;

wherein the disk can be removed from the disk-locking position by application of pressure to a center of the pie-shaped engageable region; and wherein when pressure is applied to the center of the pie-shaped engageable region, the arms arch to support and elevate the disk for easier removal, the arms not being in contact with the information-carrying portion of the disk.

2. The apparatus according to claim 1 wherein the body portion has a gap positioned around each arm allowing the arms to pivot about the first, second and third axes without contacting the body portion.

3. The apparatus according to claim 1 further comprising a disk-receiving portion and a cover portion that move relative to each other via a hinged region to form an enclosure around the disk, the body portion being positioned within the disk-receiving portion.

4. The apparatus according to claim 3 wherein the first, second and third pivot axes have a first vertical plane that is positioned towards the central hole of the disk and away from a second vertical plane created by contact points when the covet portion is pressed against the engageable portions.

5. The apparatus according to claim 1 further comprising at least three ridges extending from the body portion to support a bottom surface of the disk when in a disk-locking position, wherein the ridges do not contact an information-carrying portion of the disk.

6. The apparatus according to claim 1 wherein when pressure is applied to the center of the pie-shaped engageable region, a bounded region of the lips decreases to a size less than a circumference of the central hole of the disk.

7. The apparatus according to claim 1 wherein the arms provide support to the bottom surface of the disk when in the disk-locking position, the arms not being in contact with the information-carrying portion of the disk.

8. The apparatus according to claim 1 wherein the body portion further comprises a connecting member for connection to each extension member, each extension member and connecting member being pivotally attached at the second pivot axis.

9. The apparatus according to claim 8 wherein each connecting member is elevated from the body portion.

* * * * *